(12) United States Patent
Collmer et al.

(10) Patent No.: US 11,046,149 B2
(45) Date of Patent: Jun. 29, 2021

(54) COMBUSTION CHAMBER ASSEMBLY

(71) Applicant: Eberspächer Climate Control Systems GmbH & Co. KG, Esslingen (DE)

(72) Inventors: Andreas Collmer, Aichwald (DE); Michael Haefner, Stuttgart (DE)

(73) Assignee: Eberspächer Climate Control Systems GmbH, Esslingen (DE)

(*) Notice: Subject to any disclaimer, the term of this patent is extended or adjusted under 35 U.S.C. 154(b) by 189 days.

(21) Appl. No.: 16/043,334

(22) Filed: Jul. 24, 2018

(65) Prior Publication Data

US 2019/0030993 A1    Jan. 31, 2019

(30) Foreign Application Priority Data

Jul. 27, 2017 (DE) ...................... 10 2017 116 985.7

(51) Int. Cl.
  *B60H 1/22* (2006.01)
  *F16J 15/00* (2006.01)
  (Continued)

(52) U.S. Cl.
  CPC ............ *B60H 1/2212* (2013.01); *B23P 19/04* (2013.01); *F16J 15/00* (2013.01); *F23Q 7/06* (2013.01);
  (Continued)

(58) Field of Classification Search
  CPC .......... B60H 1/2212; B60H 2001/2271; B23P 19/04; F16J 15/00; F23Q 7/06; F23N 2241/14; H02G 3/22
  (Continued)

(56) References Cited

U.S. PATENT DOCUMENTS 4,732,322 A    3/1988  Gaysert et al.
5,320,523 A *  6/1994  Stark ..................... F23N 5/20
                                            431/353
(Continued)

FOREIGN PATENT DOCUMENTS

CN    101349365 A    1/2009
CN    202126219 U    1/2012
(Continued)

OTHER PUBLICATIONS

"JP_3236390_B2_M—Machine Translation.pdf", Machine Translation, J-PlatPat / JP.org, Apr. 25, 2020.*
(Continued)

*Primary Examiner* — Daniel E. Namay
(74) *Attorney, Agent, or Firm* — McGlew and Tuttle, P.C.

(57) ABSTRACT

A vehicle heater combustion chamber assembly includes a housing area (14) with an ignition element mount (36) supporting an ignition element (34) and another housing area (16) defining a fluid flow space (26) with an access opening (32). The ignition element or/and an electric ignition element line (76) is moveable through the access opening. An elastically deformable closing element (40) closes the access opening and includes a meshing area (48), interacting with a housing area wall (42) surrounding the ignition element access opening and including an inner meshing area supported relative to an inner surface of the wall, which faces the fluid flow space. The closing element includes a closing element bottom (44) with an outer bottom surface (94) oriented outwardly, in the direction away from the fluid flow space. The outer bottom surface is offset in a direction of a closing element longitudinal axis towards the fluid flow space.

18 Claims, 7 Drawing Sheets

(51) Int. Cl.
*F23Q 7/06* (2006.01)
*B23P 19/04* (2006.01)
*H02G 3/22* (2006.01)

(52) U.S. Cl.
CPC .. *B60H 2001/2271* (2013.01); *F23N 2241/14* (2020.01); *H02G 3/22* (2013.01)

(58) Field of Classification Search
USPC .................................................. 237/12.3 C
See application file for complete search history.

(56) References Cited

U.S. PATENT DOCUMENTS

| | | | |
|---|---|---|---|
| 5,894,988 A * | 4/1999 | Brenner | B60H 1/2206 431/6 |
| 6,082,625 A * | 7/2000 | Faccone | B60H 1/032 237/12.3 C |
| 6,739,868 B2 * | 5/2004 | Haefner | F02P 19/00 237/12.3 C |
| 6,929,467 B2 * | 8/2005 | Blaschke | F23D 3/40 126/116 R |
| 8,191,414 B2 | 6/2012 | Kume et al. | |
| 9,636,972 B2 * | 5/2017 | Haefner | B60H 1/2203 |
| 9,897,311 B2 * | 2/2018 | Collmer | B60H 1/2203 |
| 2003/0118964 A1 * | 6/2003 | Blaschke | F23D 3/40 431/262 |
| 2004/0013990 A1 | 1/2004 | Haefner et al. | |
| 2008/0230257 A1 | 9/2008 | Kawasaki et al. | |
| 2012/0104109 A1 * | 5/2012 | Wetzl | F23Q 7/06 237/12.3 C |
| 2013/0015255 A1 * | 1/2013 | Collmer | B60H 1/2212 237/32 |
| 2014/0217189 A1 * | 8/2014 | Haefner | B60H 1/02 237/44 |
| 2015/0102117 A1 * | 4/2015 | Collmer | F23D 11/406 237/12.3 C |
| 2016/0365706 A1 * | 12/2016 | Bowman | F16J 15/00 |
| 2020/0055374 A1 * | 2/2020 | Collmer | B60H 1/2206 |

FOREIGN PATENT DOCUMENTS

| | | | | |
|---|---|---|---|---|
| DE | 35 22 697 A1 | 11/1985 | | |
| DE | 102 29 852 C1 | 10/2003 | | |
| DE | 10229852 C1 * | 10/2003 | | F02P 19/00 |
| EP | 0287712 A2 * | 10/1988 | | B60H 1/2203 |
| EP | 0 580 130 A1 | 1/1994 | | |
| JP | H07-245 031 A | 9/1995 | | |
| JP | 3 236390 B2 | 12/2001 | | |
| JP | 3236390 B2 | 12/2001 | | |

OTHER PUBLICATIONS

"CIPO Office Action 4-9-2020.pdf", Office Action from the China National Intellectual Property Administraction, CCPIT Patent and Trademark Law Office, dated Apr. 9, 2020. (Year: 2020).*

* cited by examiner

COMBUSTION CHAMBER ASSEMBLY

CROSS REFERENCE TO RELATED APPLICATIONS

This application claims the benefit of priority under 35 U.S.C. § 119 of German Application 10 2017 116 985.7, filed Jul. 27, 2017, the entire contents of which are incorporated herein by reference.

FIELD OF THE INVENTION

The present invention pertains to a combustion chamber assembly, which can be used especially in a vehicle heater for burning a mixture of combustion air and fuel and for transferring heat generated during the combustion to a heat transfer medium.

BACKGROUND OF THE INVENTION

A combustion chamber assembly, in which a combustion chamber housing defining essentially a combustion chamber forms a first housing area, while a heat exchanger housing forms a second housing area, is known from DE 102 29 852 C1. A flow space is formed between the two housing areas for combustion air to be introduced into the combustion chamber.

An ignition element mount, at which an ignition element provided for igniting the mixture formed in the combustion chamber is supported, is provided at the first housing area forming the combustion chamber housing. In association with the ignition element mount, an ignition element access opening is provided at the housing area forming the heat exchanger housing. The ignition element can be moved through this ignition element access opening in the direction of the ignition element mount and an electric line, which originates from the ignition element and with which the ignition element can be connected to a power source for supplying electric power, extends through this ignition element access opening.

An elastically deformable closing element made, for example, of a rubber-elastic material, is provided for closing the ignition element access opening. This closing element has an essentially pot-like structure with a closing element bottom and with a circumferential wall, which extends, starting from the closing element bottom, in the direction of the flow space. An inner meshing area is formed on an outer side of the circumferential wall at a meshing area projecting radially in relation to a closing element longitudinal axis, and this inner meshing area is supported at a surface, which is oriented in the direction of the flow space and annularly surrounds the ignition element access opening (in a ring-shaped manner), at a wall of the second housing area in the direction away from the flow space. The electrical line provided for supplying the ignition element with electric power passes through the closing element bottom and extends in the area of an outer bottom surface of the closing element bottom, which bottom surface is oriented away from the flow space, out of the closing element and away from same.

SUMMARY OF THE INVENTION

The object of the present invention is to provide a combustion chamber assembly, especially for a vehicle heater, as well as a process for assembling such a combustion chamber assembly, which make possible a simple assembly of the combustion chamber assembly while the combustion chamber assembly has a simple configuration.

This object is accomplished according to the present invention by a combustion chamber assembly, especially for a vehicle heater, the combustion chamber assembly comprising a first housing area with an ignition element mount, wherein an ignition element is supported at the ignition element mount, a second housing area defining a fluid flow space to an outside with an ignition element access opening, wherein the ignition element is movable through the ignition element access opening to the ignition element mount or/and an electric line for the ignition element passes through the ignition element access opening, and an elastically deformable closing element for closing the ignition element access opening, wherein the closing element comprises a meshing area interacting with a wall of the second housing area, which wall surrounds the ignition element access opening, wherein the meshing area comprises an inner meshing area supported in relation to an inner surface of the wall, which inner surface faces the fluid flow space, and wherein the closing element comprises a closing element bottom with an outer bottom surface oriented outwardly, in the direction away from the fluid flow space.

The combustion chamber assembly is characterized in that the outer bottom surface is offset in relation to the inner meshing area towards the fluid flow space in the direction of a closing element longitudinal axis.

The outer bottom surface offset in the direction of the fluid flow space in relation to the inner meshing area can be acted on by an assembly tool during the assembly of the combustion chamber assembly, so that the elastically deformable closing element is moved into the ignition element access opening essentially with a pulling motion. This means that the area in which the force is introduced by means of the assembly tool into the closing element is upstream of the area in which the meshing area, especially the inner meshing area, is formed, during this motion or action, and the assembly tool pulls this into the ignition element access opening with an elastic deformation, especially axial stretching of the closing element. This substantially simplifies the assembly operation, because the closing element is stretched axially by this pulling action and a closing element radial dimension is reduced in the process in relation to the closing element longitudinal axis and thus it can be moved more easily through and into the ignition element access opening.

To guarantee a stable contact and especially a fluid-tight closure of the flow space, it is proposed that the inner meshing area comprise an inner contact surface, which annularly surrounds the closing element longitudinal axis (in a ring-shaped manner) and is oriented essentially at right angles to the closing element longitudinal axis.

The axial stretching of the closing element during the process of insertion into the ignition element access opening can be achieved or supported, for example, by the closing element comprising an outer meshing area supported in relation to an outer surface of the wall, which outer surface faces away from the fluid flow space.

The outer meshing area can also support the fluid-tight closure by comprising an outer contact surface, which annularly surrounds the closing element longitudinal axis (in a ring-shaped manner) and is oriented essentially at right angles to the closing element longitudinal axis.

An even more improved holding together of the closing element with the second housing area can be achieved according to the present invention, while the sealing effect is improved further, for example, by the closing element comprising a circumferential meshing area supported in relation to an opening circumferential surface of the wall, which opening circumferential surface surrounds the ignition element access opening. In particular, provisions may be made in this case for the opening circumferential surface of the wall to have a conical configuration, such that the ignition element access opening tapers in the direction of the fluid flow space. The circumferential meshing area may comprise here a conical circumferential contact surface annularly surrounding the closing element longitudinal axis (in a ring-shaped manner).

It is proposed for a configuration that can be embodied in a simple manner and nevertheless functions in a stable and tight manner that the inner contact surface, the outer contact surface and the circumferential contact surface define a circumferential groove, which is radially outwardly open in relation to the closing element longitudinal axis and receives the wall of the second housing area.

To also guarantee a stable mounting for the ignition element by means of the closing element, an acting projection, which projects in the direction of the closing element longitudinal axis towards the fluid flow space and acts on the ignition element in contact with the ignition element mount, may be provided on an inner side of the closing element bottom, which inner side faces the fluid flow space. Further, a line projection, which projects in the direction of the closing element longitudinal axis away from the fluid flow space and through which the electric line passes, may be provided on an outer side of the closing element bottom, which outer side faces away from the fluid flow space, for a stable integration of the electric line supplying the ignition element with electric power. The outer bottom surface may surround the closing element longitudinal axis in a ring-shaped manner.

The first housing area may provide a combustion chamber housing defining a combustion chamber. The second housing area may provide a heat exchanger housing. The fluid flow space defined between the two housing areas is preferably a combustion air flow space.

It is proposed for a configuration supporting the above-described pulling action of the closing element that the closing element comprise a closing element circumferential wall, which extends from the closing element bottom away from the fluid flow space in the direction of the closing element longitudinal axis and forms the meshing area.

According to another aspect, the object described at the beginning is accomplished by a process for assembling a combustion chamber assembly as discussed above, the process comprising the steps of a) providing a housing unit with the first housing area and with the second housing area such that the ignition element mount is positioned in the area of the ignition element access opening, b) inserting the ignition element through the ignition element access opening such that the ignition element is brought into contact with the ignition element mount, c) inserting the closing element into the ignition element access opening by means of an assembly tool acting on the outer bottom surface such that the closing element with a closing element bottom and an inner meshing area is moved by the assembly tool acting on the outer bottom surface in the direction of the closing element longitudinal axis towards the fluid flow space through the ignition element access opening until the inner meshing area is positioned essentially on the inner side in relation to the inner surface of the wall of the second housing area, and d) removing the assembly tool from the outer bottom surface and releasing in the process the closing element such that the inner meshing area radially overlaps the inner surface of the wall of the second housing area due to a radially outwardly displacement and comes into contact with same.

To simplify the assembly process, it is proposed that before steps b) and c) are carried out, a preassembled assembly unit comprising the ignition element and the closing element be provided and that the preassembled assembly unit be inserted into the ignition element access opening through said ignition element access opening in steps b) and c).

To bring about the axial stretching of the closing element by the action of the assembly tool, the closing element with its outer meshing area can be supported in step c) on the outer surface of the wall of the second housing area in the direction of the closing element longitudinal axis.

After step d), the acting projection preferably presses the ignition element into contact with the ignition element mount. No additional structural configurations or method steps are thus necessary to guarantee stable mounting of the ignition element.

Provisions may further be made for the closing element to comprise a closing element circumferential wall, which extends from the closing element bottom in the direction of the closing element longitudinal axis away from the fluid flow space and forms the meshing area; for the assembly tool to comprise an essentially cylindrical, preferably hollow cylindrical, acting area, in which the assembly tool acts on the closing element, and for an internal dimension, preferably internal diameter, of the closing element circumferential wall to be greater when the closing element is not being acted on by the assembly tool than an external dimension, preferably external diameter, of the assembly tool in an area in which the assembly foil acts on the closing element.

The present invention will be described in detail below with reference to the attached figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
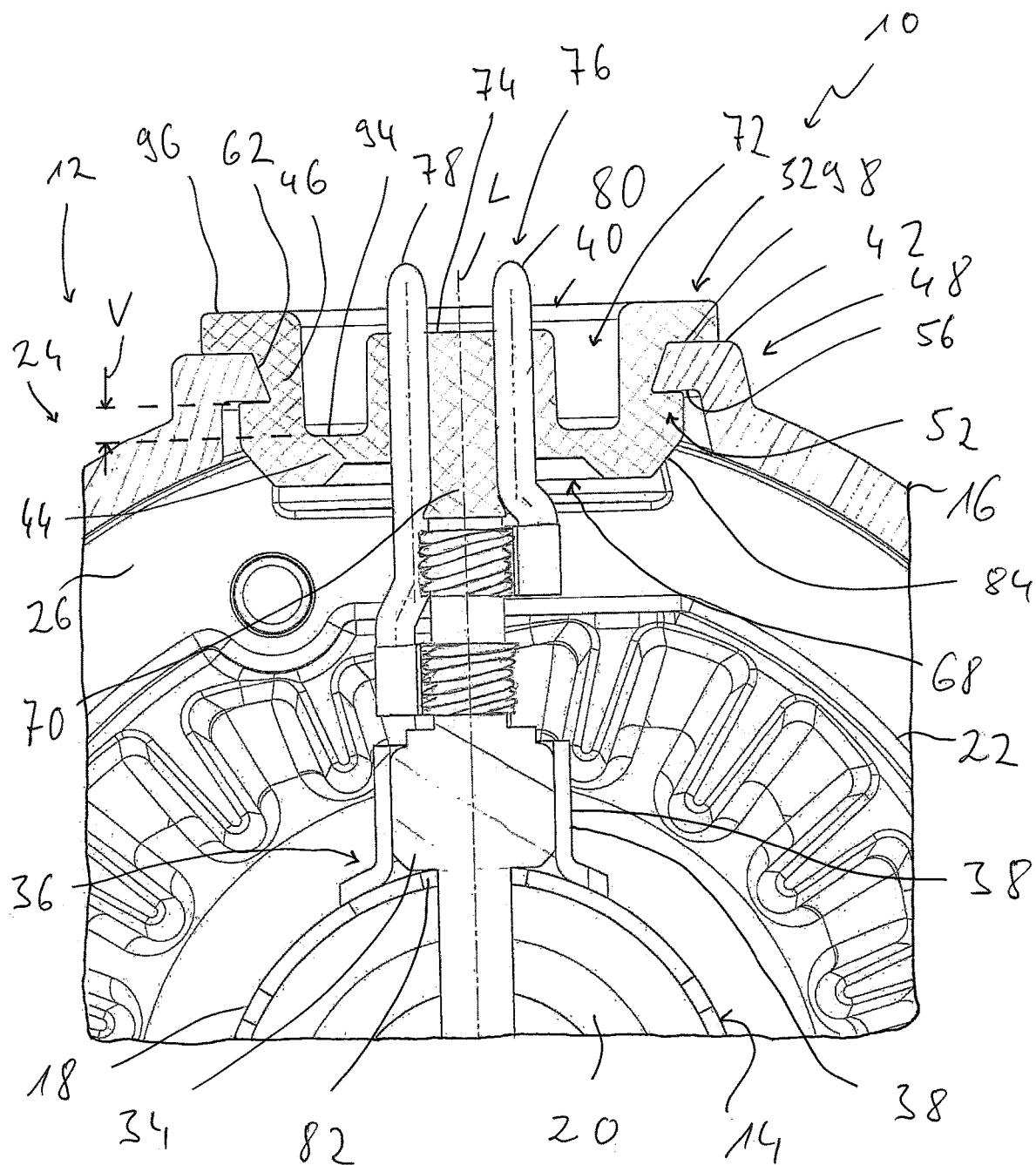
FIG. 1 is a partial cross section of a combustion chamber assembly for a vehicle heater.

Referring to the drawings, FIG. 1 shows a combustion chamber assembly generally designated by 10 for a fuel-operated vehicle heater. The combustion chamber assembly 10 comprises a housing unit 12 with a first housing area 14 and with a second housing area 16.

The first housing area 14 forms a combustion chamber housing generally designated by 18 with a combustion chamber 20 formed therein. Fuel and combustion air are fed into the combustion chamber 20 in order to generate and burn an ignitable mixture. The second housing area 16 forms essentially a heat exchanger housing 22, which surrounds the combustion chamber housing 18 on the outer side thereof. In the length area 24 of the heat exchanger housing 22, which length area is shown in FIG. 1, a flow space 26 is formed between the heat exchanger housing and the combustion chamber housing for air to be fed into the combustion chamber 20. This air is delivered, for example, by a side channel blower or the like into the flow space 26 and via this into the combustion chamber 20.

Heat transfer ribs 30 are formed on the outer side of the heat exchanger housing 22 in a length area 28, so that air flowing around the outer side of the heat exchanger housing 22 can absorb heat, which is absorbed by the heat exchanger housing 22 in the length area 28 from the combustion waste gas flowing on the inner side of said heat exchanger housing, An ignition element access opening 32 for an ignition element 34 shown in FIG. 1, for example, a glow plug, is provided in the length area 24 of the heat exchanger housing 22 or of the second housing area 16 of the housing unit 12. In association with the ignition element access opening 32, an ignition element mount generally designated by 36 is formed at the first housing area 14. This mount may comprise on the outer side of the combustion chamber housing 18 an ignition element mounting sleeve 38, which centers the ignition element 34 and ensures that this ignition element 34 is seated in an ignition element longitudinal direction on an outer surface of the combustion chamber housing 18 in a defined manner, without being able to be displaced laterally, i.e., essentially in the circumferential direction, along the outer side of the combustion chamber housing 18.

Further, a closing element, generally designated by 40, is provided in association with the ignition element access opening 32. The closing element 40 is elastically deformable, which means in the sense of the present invention that it can be deformed for insertion into the ignition element access opening 32 and returns essentially to a closing element initial shape based on a closing element own elasticity and, as will still be shown later, is held in a stable manner at a wall 42 of the second housing area 16. The closing element 40 may be made, for example, of rubber or a rubber-like material.

The closing element 40 is configured with an essentially pot-like structure and comprises a closing element bottom 44 and a closing element circumferential wall 46 extending from this closing element bottom in the direction of a closing element longitudinal axis L. A meshing area 48 configured for interaction with the wall 42 of the second housing area 16 is provided at the closing element circumferential wall. The meshing area 48 comprises essentially a circumferential groove 50, which can also be seen in FIG. 2 and in FIG. 4, and with which the wall 42 with a wall area surrounding the ignition element access opening 32 meshes when the closing element 40 is arranged at the second housing area 16.

The meshing area 48 comprises an inner meshing area 52, which comprises an inner contact surface 54 in the exemplary embodiment shown. The inner contact surface 54 is provided at the closing element 40 such that the inner contact surface surrounds the closing element longitudinal axis L in an essentially ring-shaped manner and is oriented essentially at right angles to same, namely, in the direction away from the flow space 26. With the closing element 40 arranged at the second housing area 16, the inner contact surface 54 is thus in contact with an inner surface 56 of the wall 42 with the inner contact surface area surrounding the ignition element access opening 32. The inner surface 56 of the wall 42 is a surface thereof, which is oriented essentially in the direction of the flow space 26, i.e., inwardly.

Figure 2:
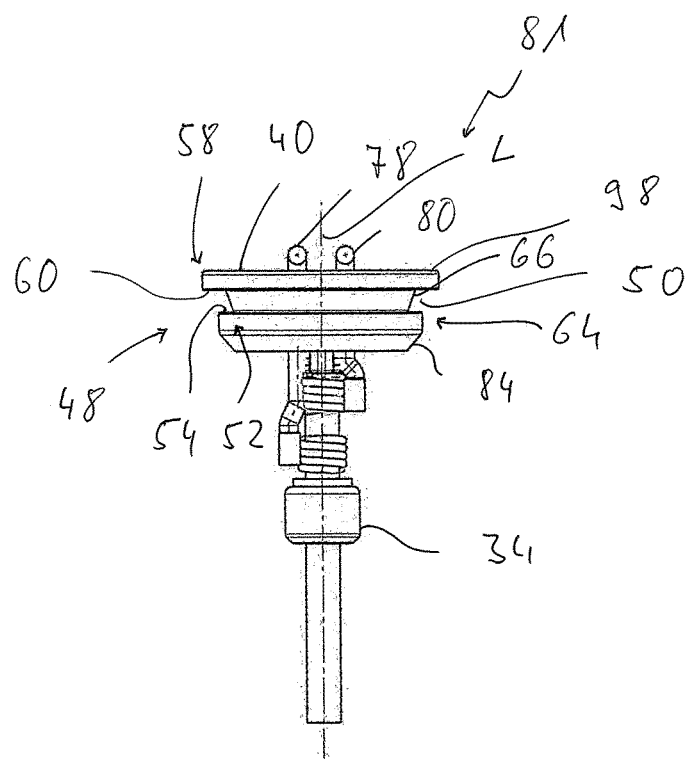
FIG. 2 is a side view of an ignition element and a preassembled assembly unit comprising an elastically deformable closing element.
Figure 3:
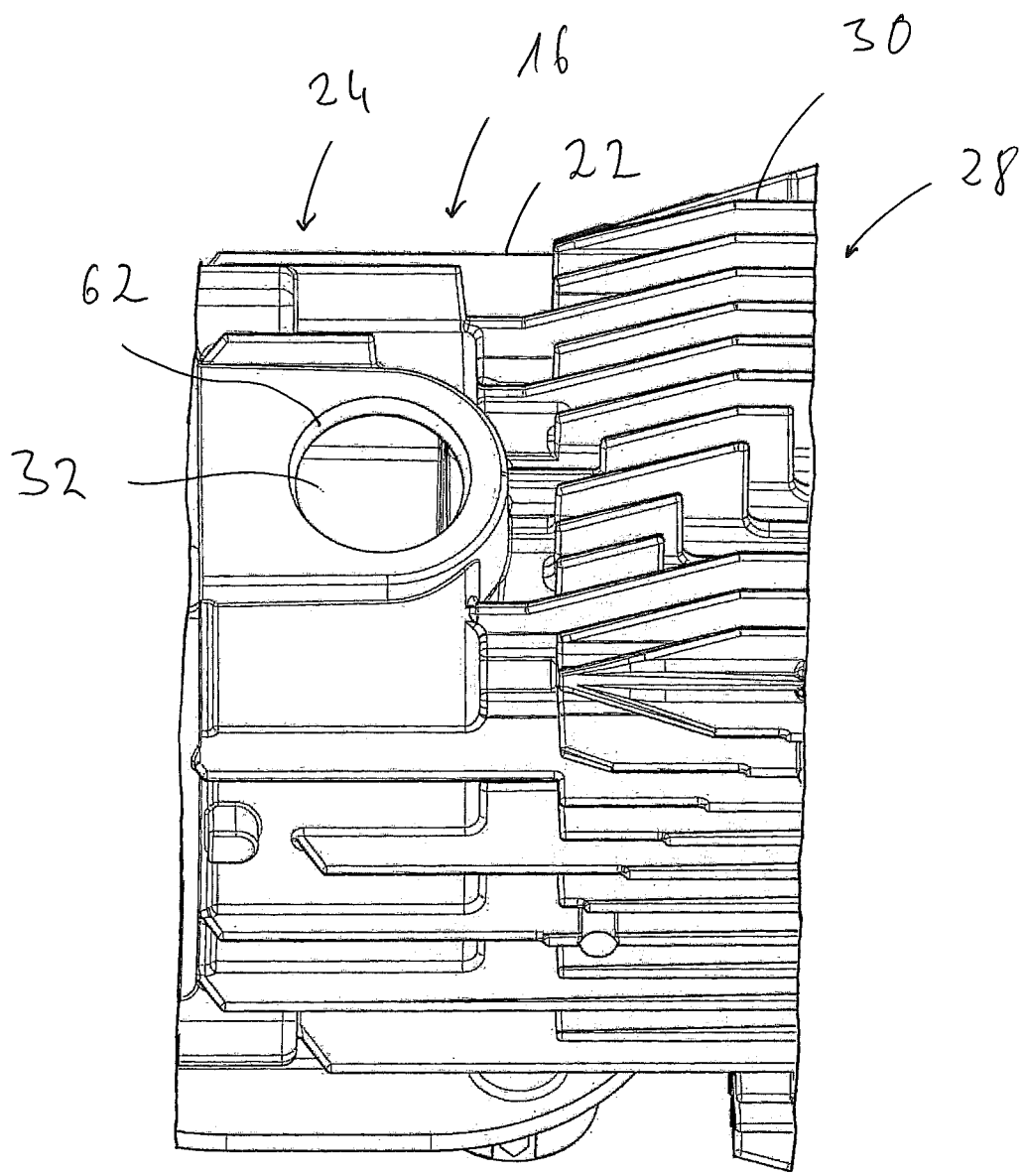
FIG. 3 is a partial view of a heat exchanger housing with an ignition element access opening formed thereon.
Figure 4:
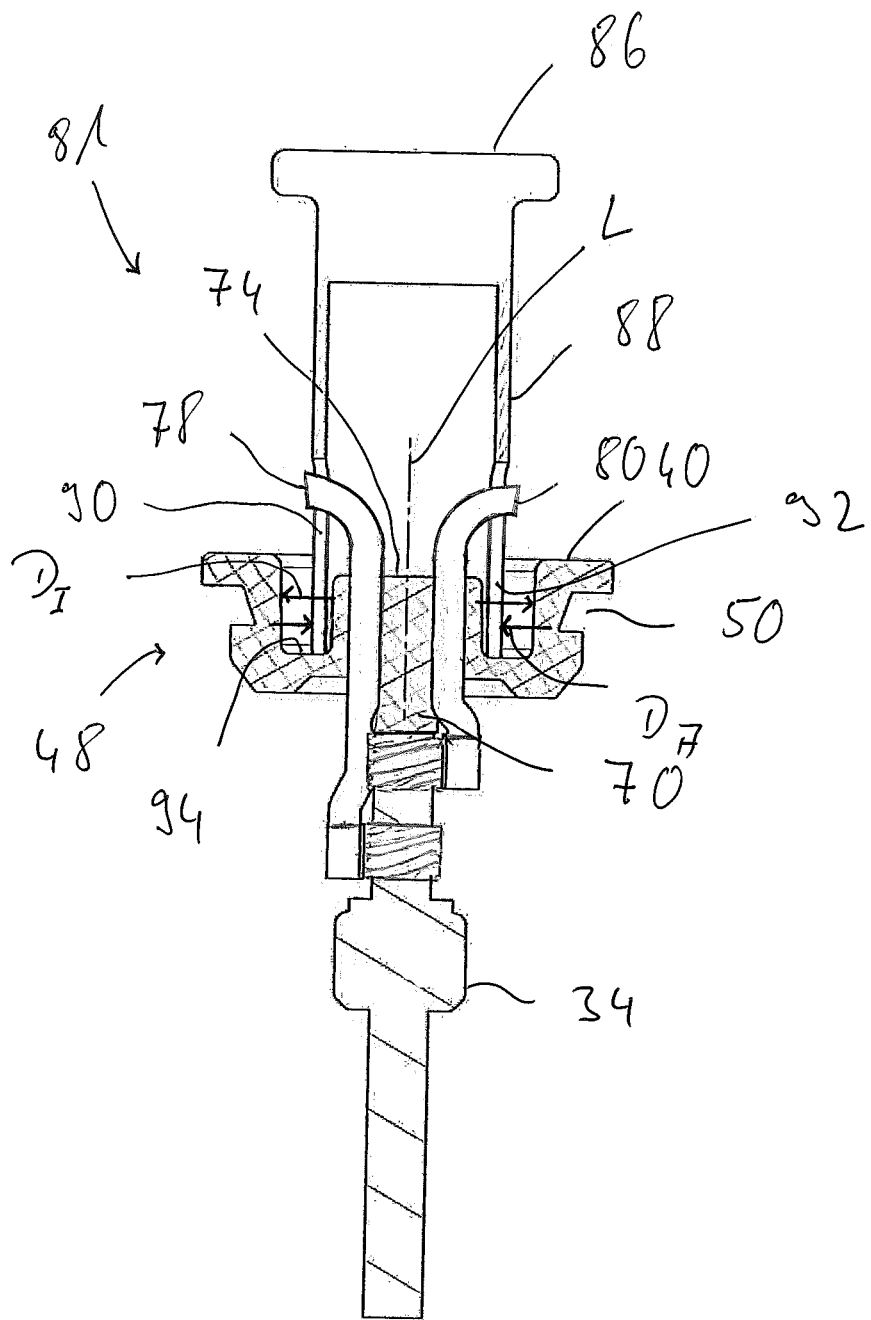
FIG. 4 is a longitudinal sectional view of the preassembled assembly unit according to FIG. 2 in connection with an assembly tool.

The closing element 40 further comprises an outer meshing area 58 with an outer contact surface 60, which annularly surrounds the closing element longitudinal axis L (surrounds in a ring-shaped manner) and is oriented thereto essentially at right angles, in the direction of the flow space 26. It is seen in FIGS. 2 and 4 that the two contact surfaces 54, 60 are arranged in relation to each other essentially parallel and opposite each other, especially with the closing element 40 released.

In association with an opening circumferential surface 62 of the wall 42, which surface essentially defines the ignition element access opening 32 in the radial direction, the closing element 40 has a circumferential meshing area 64. The circumferential meshing area 64 comprises a circumferential contact surface 66, which is essentially fully in contact with the opening circumferential surface 62 when the closing element 40 is inserted into the ignition element access opening 32. It is seen clearly especially in FIG. 1 that the opening circumferential surface 62 has an essentially conical configuration, so that the ignition element access opening 32 has a cross section decreasing in the direction of the flow space 26, i.e., it is configured such that it tapers in this direction. The circumferential contact surface 66 correspondingly also has a conical configuration complementarily to the opening circumferential surface 62 in the released state of the closing element 40. The circumferential groove 50, which is open radially outwardly in relation to the closing element longitudinal axis L, is defined between the inner contact surface 54, the outer contact surface 60 and the circumferential contact surface 66.

An acting projection 70 is provided at the closing element bottom 44 on the inner side 68 thereof facing the flow space 26. This acting projection 70 protrudes into the flow space 26 to the extent that the acting projection 70 is in contact with the ignition element 34 and the acting projection 70 prestresses the ignition element 34 in the direction of the closing element longitudinal axis L, which also corresponds in the assembled state essentially to a longitudinal axis of the ignition element 34, in the direction of the ignition element mount 36 and thus ensures a defined positioning of the ignition element 34.

A line projection 74 extending in the direction away from the flow space 26, i.e., outwardly, is provided on an outer side 72 of the closing element bottom 44, which outer side faces away from the flow space 26, preferably centrally in relation to the closing element longitudinal axis L. An electric line 76 provided for supplying the ignition element 34 with electric power or the two conductors 78, 80 of the line 76 is/are led through the element bottom 44 in the area of the line projection 74.

The flow space 26 is closed by the closing element 40 in a fluid-tight manner because, on the one hand, the closing element 40 is in contact with the wall 42 of the second housing area 16 under prestress based on its elasticity in the assembled state and thus guarantees a fluid-tight connection over essentially the entire surface in this area especially with its contact surfaces 54, 60, 66, and, on the other hand, the closing element 40 is also in contact with the outer surfaces of the conductors 78, 80 of the line 76. Since the combustion air to be delivered to the combustion chamber 20 flows in this flow space 26, there is no risk that an excessive heating of the closing element 40 would develop during the combustion operation.

It will be described below with reference to FIGS. 2 through 7 how the combustion chamber assembly 10 shown in FIG. 1 can be assembled, and especially how the ignition element 34 and the closing element 40 can be inserted into this.

The housing unit 12 with the two housing areas 14, 16 and additional system areas not shown in the figures is first assembled for this, namely, such that the ignition element mount 36 is positioned essentially in the area of the ignition element access opening 32, i.e., there is an access to this ignition element mount 36 from the outside. Further, a preassembled assembly unit 81, which can be seen in FIGS. 2 and 4, which comprises essentially the ignition element 34 and the closing element 40, is provided. The two conductors 78, 80 or generally the line 76 can be led for this through the closing element bottom 44 in the area of the openings provided herefor in the line projection 74 and the closing element 40 can be moved so close to the ignition element 34 that the acting projection 70 is in contact with the ignition element 34.

This preassembled assembly unit 81 is then moved from the outside to the housing unit 12, especially to the second housing area 16, so that the ignition element 34 is led through the ignition element access opening 32 and it reaches the area of the ignition element mount 36. In the course of this motion, the ignition element 34 also passes through an opening 82 provided for this in the combustion chamber housing 18, until the ignition element 34 comes into contact with the ignition element mount 36.

In the course of this motion, the closing element 40 also approaches the wall 42 of the second housing area 16. In the transition area from the closing element bottom 44 to the closing element circumferential wall 46, the closing element 40 has a lead-in bevel 84, which basically facilitates the insertion of the closing element 40 into the ignition element access opening 32 with elastic deformation of the closing element 40 in conjunction with the conically shaped opening circumferential wall 62 of the wall 42.

Figure 5:
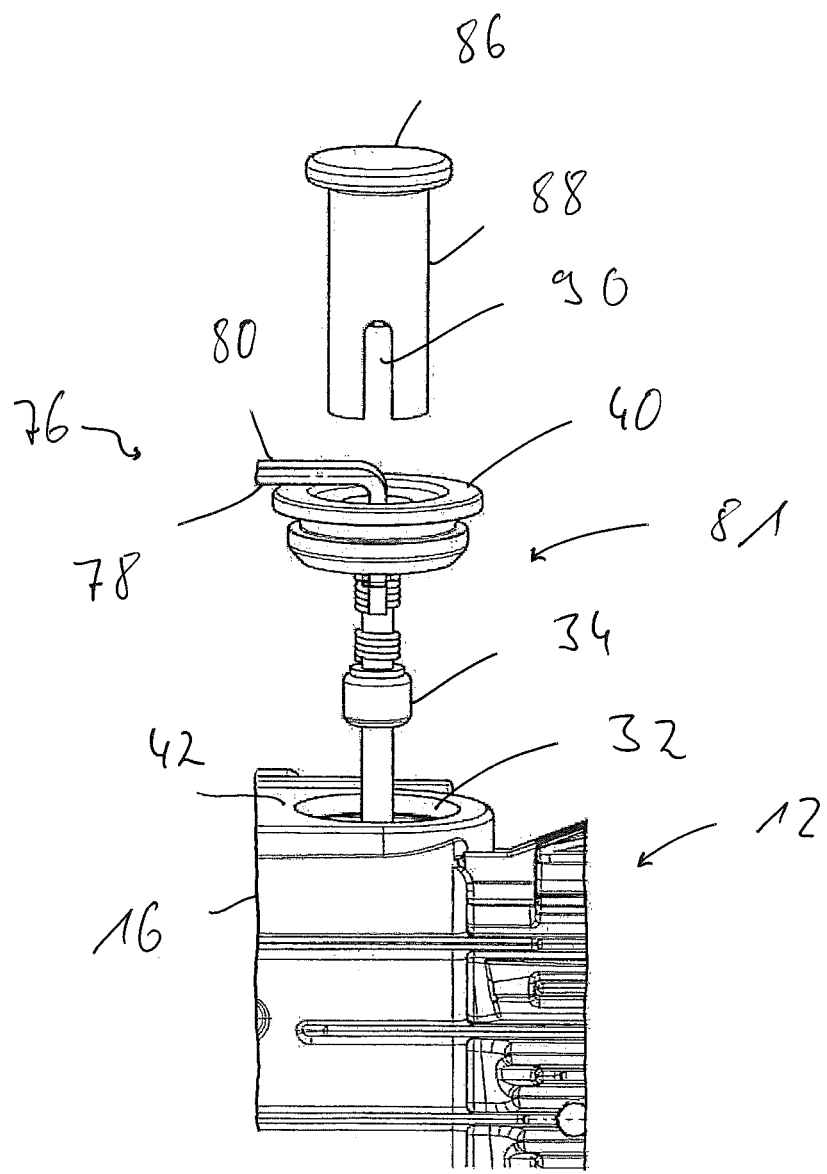
FIG. 5 is a perspective view showing the process of inserting the preassembled assembly unit according to FIGS. 2 and 4 during the passage of the ignition element through the ignition element access opening.
Figure 6:
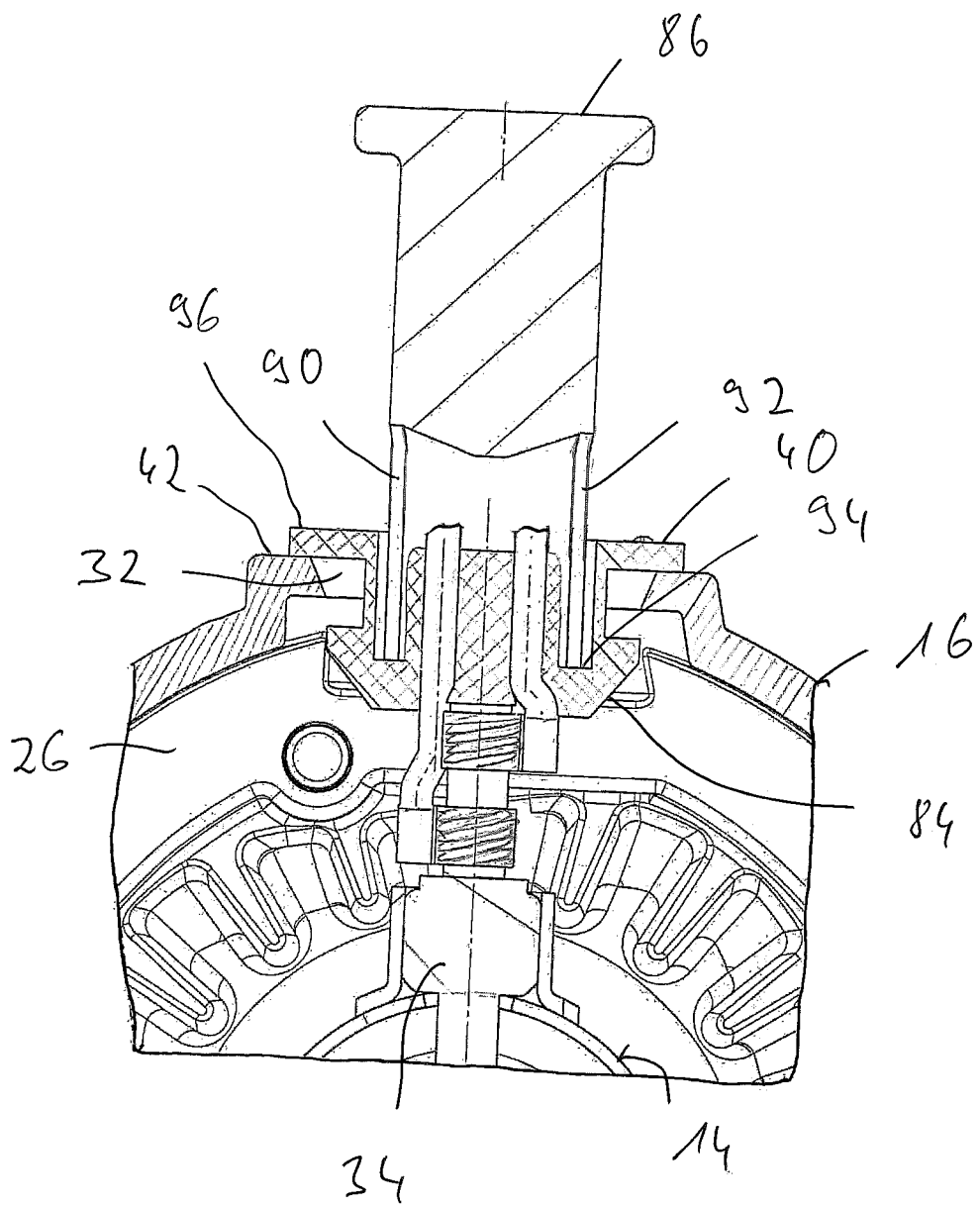
FIG. 6 is a sectional view showing the process of inserting the preassembled assembly unit according to FIGS. 2 and 4 with the ignition element passed through the ignition element access opening and with the closing element supported in relation to a wall of the heat exchanger housing in axially stretched state.
Figure 7:
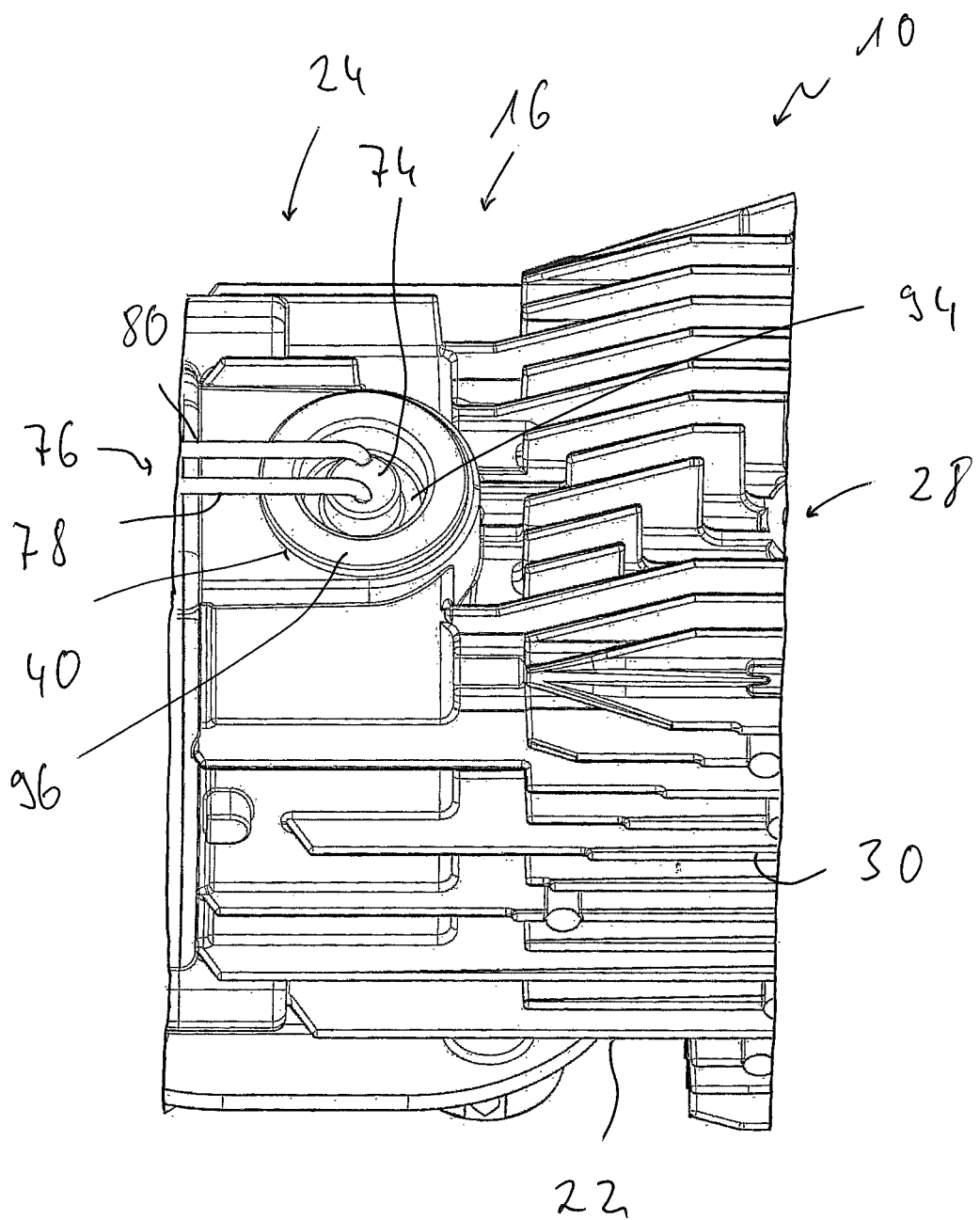
FIG. 7 is a partial view, corresponding to FIG. 3, of the heat exchanger housing with the closing element inserted into the ignition element access opening.

An assembly tool 86, which can be seen especially in FIGS. 4 through 6, is used to bring about this elastic deformation. This assembly tool 86 has an essentially hollow cylindrically configured acting area 88, in which the assembly tool 86 acts on the closing element, and which has axially open recesses 90, 92 for passing through the conductors 78, 80.

The closing element bottom 44 forms, especially because of the presence of the line projection 74, an outer bottom surface 94, which surrounds the closing element longitudinal axis L in an essentially ring-shaped manner and which extends in the radial direction in relation to the closing element longitudinal axis L essentially between the closing element circumferential wall 46 and the performance projection. The outer bottom surface 94 is oriented in the direction away from the flow space 26 and has an offset V in relation to the inner contact surface 54 of the closing element 40 in the direction of the closing element longitudinal axis L towards the flow space 26. Under the action of the assembly tool 86, the latter comes into contact with the closing element 40 in the area of the outer bottom surface 94 of the closing element bottom 44, i.e., in an area that is upstream of the inner contact surface 54 of the inner meshing area 52 during the motion towards or into the flow space 26. This means that the closing element 40 is subjected to a pulling stress under the action of the assembly tool 86 in the area of the outer bottom surface 94, i.e., the areas that flow in the rearward direction against the motion direction into the flow space 26 are pulled.

During such an action of the assembly tool 86, the closing element 40 with the closing element bottom 44 is first moved through or pulled through the ignition element access opening 32, which is supported, as was already described above, by the interaction of the lead-in bevel 84 with the opening circumferential surface 62. In the course of this motion, an area 96 of the closing element 40, which area forms an outer meshing area 58 and projects radially outwardly in a flange-like manner in relation to the closing element longitudinal axis L, comes into contact with an outer surface 98 of the wall 42 and thus forms an abutment. The closing element 40 is now stretched axially, i.e., in the direction of the closing element longitudinal axis L, and the radial dimension of the closing element 40 decreases due to this stretching. This is also made possible especially by the closing element circumferential wall having an internal dimension DI, i.e., for example, an internal diameter, that is greater than an external dimension DA, i.e., for example, the external diameter, of the assembly tool 86 in an acting area 88, in which the assembly 86 acts on the closing element. Thus, there is a sufficient intermediate space between the closing element circumferential wall 46 and the acting area 88, in which the closing element is acted on, so that a reduction in the radial extension of the closing element 40 is not hindered by the assembly tool 86.

The closing element 40 is acted on by the assembly tool 86 such and until the closing element bottom 44, and with this the inner meshing area 52, have been moved axially to the extent that the inner meshing area 52 or the inner meshing area inner contact surface 54 is essentially in contact with the inner side in relation of the inner surface 56 of the wall 42. If this has been accomplished, the axial action of the assembly tool 86 is ended, so that the closing element 40 can again contract axially and the closing element 40 expands radially in the process. The closing element 40, which is already in contact in this state by a closing element outer contact surface 60 with the outer surface 98 of the wall 42, also comes into contact in the course of this release by its inner contact surface 54 with the inner surface 56 of the wall 42 or the closing element 40 comes into contact by closing element circumferential contact surface 66 with the opening circumferential surface 62 of the wall 42. As was already described above, the closing element 40 is in contact in this state, due to a closing element elasticity, with the different surfaces of the wall 42 of the second housing area 16 and also with the conductors 78, 80 under a prestress, and thus the closing element 40 establishes a fluid-tight closure of the flow space 26. At the same time, the closing element 40, being thus held at the second housing area 16, acts on the ignition element 34, on the ignition element mount 36 thereof, in the direction of the closing element longitudinal axis L, so that the ignition element 34 is also held in a defined position.

While specific embodiments of the invention have been shown and described in detail to illustrate the application of the principles of the invention, it will be understood that the invention may be embodied otherwise without departing from such principles.

What is claimed is:

1. A combustion chamber assembly comprising:
   a first housing area with an ignition element mount, wherein an ignition element is supported at the ignition element mount;
   a second housing area defining a fluid flow space to an outside with an ignition element access opening, wherein the ignition element is moveable to the ignition element mount through the ignition element access opening or an electric line for the ignition element extends through the ignition element access opening; or the ignition element is moveable to the ignition element mount through the ignition element access opening and an electric line for the ignition element extends through the ignition element access opening; and
   an elastically deformable closing element for closing the ignition element access opening, wherein the closing element comprises a meshing area interacting with a wall of the second housing area, which wall surrounds the ignition element access opening, wherein the meshing area comprises an inner meshing area supported in relation to an inner surface of the wall, which said inner surface faces the fluid flow space, the inner meshing area comprising an inner contact surface annularly surrounding the closing element longitudinal axis and being oriented at right angles to a closing element longitudinal axis, wherein the closing element further comprises an outer meshing area supported in relation to an outer surface of the wall, which said outer surface faces away from the fluid flow space, the outer meshing area comprising an outer contact surface, which annularly surrounds the closing element longitudinal axis and is oriented essentially at right angles to the closing element longitudinal axis, and wherein the closing element comprises a closing element bottom with an outer bottom surface oriented outwardly, in a direction away from the fluid flow space, and wherein the outer bottom surface is offset in relation to the inner meshing area in a direction of the closing element longitudinal axis towards the fluid flow space.

2. The combustion chamber assembly in accordance with claim 1, wherein the inner contact surface defines a circumferential groove, which is radially outwardly open in relation to the closing element longitudinal axis and receives the wall of the second housing area.

3. The combustion chamber assembly in accordance with claim 1, wherein the inner contact surface and the outer contact surface define a circumferential groove, which is radially outwardly open in relation to the closing element longitudinal axis and receives the wall of the second housing area.

4. The combustion chamber assembly in accordance with claim 1, wherein the closing element further comprises a circumferential meshing area supported in relation to an opening circumferential surface of the wall, which said circumferential surface surrounds the ignition element access opening.

5. The combustion chamber assembly in accordance with claim 1, wherein the opening circumferential surface of the wall has a conical configuration, such that the ignition element access opening tapers in the direction of the fluid flow space, wherein the circumferential meshing area comprises a conical circumferential contact surface annularly surrounds the closing element longitudinal axis.

6. The combustion chamber assembly in accordance with claim 5, wherein the inner contact surface, the outer contact surface and the circumferential contact surface define a circumferential groove, which is radially outwardly open in relation to the closing element longitudinal axis and receives the wall of the second housing area.

7. The combustion chamber assembly in accordance with claim 1, wherein:
   an acting projection, which projects in the direction of the closing element longitudinal axis towards the fluid flow space and acts on the ignition element in contact with the ignition element mount, is provided on an inner side of the closing element bottom, which said inner side faces the fluid flow space; or
   a line projection, which projects in the direction of the element longitudinal axis away from the fluid flow space and through which the electric line passes, is provided on an outer side of the closing element bottom, which said outer side faces away from the fluid flow space; Or
   an acting projection, which projects in the direction of the closing element longitudinal axis towards the fluid flow space and acts on the ignition element in contact with the ignition element mount, is provided on an inner side of the closing element bottom, which said inner side faces the fluid flow space and a line projection, which projects in the direction of the element longitudinal axis away from the fluid flow space and through which the electric line passes, is provided on an outer side of the closing element bottom, which said outer side faces away from the fluid flow space.

8. The combustion chamber assembly in accordance with claim 1, wherein the outer bottom surface annularly surrounds the closing element longitudinal axis.

9. The combustion chamber assembly in accordance with claim 1, wherein:
   the first housing area forms a combustion chamber housing defining a combustion chamber; or
   the second housing area forms a heat exchanger area; or
   the fluid flow space is a combustion air flow space; or
   any combination of the first housing area forms a combustion chamber housing defining a combustion chamber, the second housing area forms a heat exchanger area, and the fluid flow space is a combustion air flow space.

10. The combustion chamber assembly in accordance with claim 1, wherein the closing element comprises a closing element circumferential wall, which extends from the closing element bottom in the direction of the closing element longitudinal axis away from the fluid flow space and forms the meshing area.

11. The combustion chamber assembly in accordance with claim 1, wherein the outer contact surface and the inner contact surface extend in a radial direction with respect to the closing element longitudinal axis, the outer contact surface being parallel to the inner contact surface, the outer contact surface and the inner contact surface defining at least a portion of a circumferential groove, the circumferential groove receiving at least a portion of the wall of the second housing area.

12. A process for assembling a combustion chamber assembly comprising a first housing area with an ignition element mount, wherein an ignition element is supported at the ignition element mount, a second housing area defining a fluid flow space to an outside with an ignition element access opening, wherein the ignition element is moveable to the ignition element mount through the ignition element access opening or an electric line for the ignition element extends through the ignition element access opening; or the ignition element is moveable to the ignition element mount through the ignition element access opening and an electric line for the ignition element extends through the ignition element access opening, and an elastically deformable closing element for closing the ignition element access opening, wherein the closing element comprises a meshing area interacting with a wall of the second housing area, which wall surrounds the ignition element access opening, wherein the meshing area comprises an inner meshing area supported in relation to an inner surface of the wall, which said inner surface faces the fluid flow space, the inner meshing area comprising an inner contact surface annularly surrounding the closing element longitudinal axis and being oriented at right angles to a closing element longitudinal axis, wherein the closing element further comprises an outer meshing area supported in relation to an outer surface of the wall, which said outer surface faces away from the fluid flow space, the outer meshing area comprising an outer contact surface, which annularly surrounds the closing element longitudinal axis and is oriented essentially at right angles to the closing element longitudinal axis, and wherein the closing element comprises a closing element bottom with an outer bottom surface oriented outwardly, in a direction away from the fluid flow space, and wherein the outer bottom surface is offset in relation to the inner meshing area in a direction of the closing element longitudinal axis towards the fluid flow space, the process comprising the steps of:
providing a housing unit with the first housing area and with the second housing area such that the ignition element mount is positioned in the area of the ignition element access opening;
inserting the ignition element through the ignition element access opening such that the ignition element is brought into contact with the ignition element mount;
inserting the closing element into the ignition element access opening by means of an assembly tool acting on the outer bottom surface such that the closing element with closing element bottom and with closing element inner meshing area is moved by the assembly tool acting on the outer bottom surface in the direction of the closing element longitudinal axis towards the fluid flow space through the ignition element access opening until the inner meshing area is positioned essentially on an inner side in relation to the inner surface of the wall of the second housing area; and
removing the assembly tool from the outer bottom surface and releasing the closing element with said removing such that the inner meshing area radially overlaps the inner surface of the wall of the second housing area due to a radially outward displacement and comes into contact with the inner surface.

13. The process in accordance with claim 12, wherein a preassembled assembly unit comprising the ignition element and the closing element is formed before the two steps of inserting are carried out, and the preassembled assembly unit is inserted through the ignition element access opening with the two steps of inserting.

14. The process in accordance with claim 13, wherein:
the outer meshing area of the closing element is supported in the step of inserting the closing element into the ignition element access opening by means of an assembly tool on the outer side of the wall of the second housing area in the direction of the closing element longitudinal axis.

15. The process in accordance with claim 12, wherein:
an acting projection, which projects in the direction of the closing element longitudinal axis towards the fluid flow space and acts on the ignition element in contact with the ignition element mount, is provided on an inner side of the closing element bottom, which said inner side faces the fluid flow space; or
a line projection, which projects in the direction of the element longitudinal axis away from the fluid flow space and through which the electric line passes, is provided on an outer side of the closing element bottom, which said outer side faces away from the fluid flow space; Or
an acting projection, which projects in the direction of the closing element longitudinal axis towards the fluid flow space and acts on the ignition element in contact with the ignition element mount, is provided on an inner side of the closing element bottom, which said inner side faces the fluid flow space and a line projection, which projects in the direction of the element longitudinal axis away from the fluid flow space and through which the electric line passes, is provided on an outer side of the closing element bottom, which said outer side faces away from the fluid flow space; and
the acting projection presses the ignition element into contact with the ignition element mount after the step of removing.

16. The process in accordance with claim 12, wherein:
the closing element comprises a closing element circumferential wall, which extends in the direction of the closing element longitudinal axis away from the fluid flow space and forms the meshing area;
the assembly tool comprises an essentially cylindrical or hollow cylindrical acting area, in which the assembly tool acts on the closing element; and
the closing element is not being acted on by the assembly tool, an internal dimension of the closing element circumferential wall is greater than an external dimension of the assembly tool in the acting area, in which it acts on the closing element.

17. A kit for assembling a combustion chamber assembly comprising a first housing area with an ignition element mount, wherein an ignition element is supported at the ignition element mount, a second housing area defining a fluid flow space to an outside with an ignition element access opening, wherein the ignition element is moveable to the ignition element mount through the ignition element access opening or an electric line for the ignition element extends through the ignition element access opening; or the ignition element is moveable to the ignition element mount through the ignition element access opening and an electric line for the ignition element extends through the ignition element access opening, and an elastically deformable closing element for closing the ignition element access opening, the kit comprising:
the closing element comprising a meshing area interacting with a wall of the second housing area, which wall surrounds the ignition element access opening, wherein the meshing area comprises an inner meshing area supported in relation to an inner surface of the wall, which said inner surface faces the fluid flow space, the inner meshing area comprising an inner contact surface annularly surrounding the closing element longitudinal axis and being oriented at right angles to a closing element longitudinal axis, wherein the closing element further comprises an outer meshing area supported in relation to an outer surface of the wall, which said outer surface faces away from the fluid flow space, the outer meshing area comprising an outer contact surface, which annularly surrounds the closing element longitudinal axis and is oriented essentially at right angles to the closing element longitudinal axis, and wherein the closing element comprises a closing element bottom with an outer bottom surface oriented outwardly, in a direction away from the fluid flow space, and wherein the outer bottom surface is offset in relation to the inner meshing area in a direction of the closing element longitudinal axis towards the fluid flow space; and an assembly tool configured to act on the outer bottom surface such that the closing element with closing element bottom and with closing element inner meshing area is moved by the assembly tool acting on the outer bottom surface in the direction of the closing element longitudinal axis towards the fluid flow space through the ignition element access opening until the inner meshing area is positioned essentially on an inner side in relation to the inner surface of the wall of the second housing area.

18. The kit according to claim 17, wherein:

at least a portion of the kit is provided as a preassembled assembly unit comprising the ignition element and the closing element;

the closing element comprises a closing element circumferential wall, which extends in the direction of the closing element longitudinal axis away from the fluid flow space and forms the meshing area;

the assembly tool comprises an essentially cylindrical or hollow cylindrical acting area, which acts on the closing element; and with the closing element not being acted on by the assembly tool, an internal dimension of the closing element circumferential wall is greater than an external dimension of the assembly tool in the acting area, in which it acts on the closing element.

\* \* \* \* \*